United States Patent [19]
Friedman

[11] 3,929,192
[45] Dec. 30, 1975

[54] PROCESS FOR TREATMENT OF WELLS WITH NITROGEN TETROXIDE

[75] Inventor: Robert H. Friedman, Houston, Tex.

[73] Assignee: Getty Oil Company, Los Angeles, Calif.

[22] Filed: Mar. 11, 1974

[21] Appl. No.: 449,770

[52] U.S. Cl. .................. 166/300; 166/307; 166/311
[51] Int. Cl.² .......................................... E21B 43/27
[58] Field of Search......... 166/244 C, 269, 270, 271, 166/281, 282, 300, 307, 311; 252/8.55 C

[56] References Cited
UNITED STATES PATENTS

| | | | |
|---|---|---|---|
| 2,221,353 | 11/1940 | Limerick et al. | 166/307 |
| 2,851,105 | 9/1958 | Garst | 166/305 |
| 3,167,119 | 1/1965 | Meadors | 166/274 |
| 3,259,187 | 7/1966 | Prats et al. | 166/271 |
| 3,326,289 | 6/1967 | Mulder | 166/271 |
| 3,358,763 | 12/1967 | Petty et al. | 166/307 |
| 3,367,417 | 2/1968 | McCabe | 166/307 |
| 3,529,666 | 9/1970 | Crowe | 166/307 |
| R26,466 | 9/1968 | Closmann | 166/271 |

OTHER PUBLICATIONS

"Condensed Chemical Dictionary," Sixth Edition, 1964, p. 804.

*Primary Examiner*—Frank L. Abbott
*Assistant Examiner*—Jack E. Ebel
*Attorney, Agent, or Firm*—Arnold, White & Durkee

[57] ABSTRACT

Methods for acidization of wells are disclosed which include drying the well conduit, and then injecting nitrogen tetroxide through the well into the surrounding subterranean formation whereupon the $N_2O_4$ reacts with the formation water in situ to produce nitric acid. The nitric acid reacts with formation materials to increase the permeability of the formation.

6 Claims, No Drawings

PROCESS FOR TREATMENT OF WELLS WITH NITROGEN TETROXIDE

BACKGROUND OF THE INVENTION

This invention relates generally to wells such as oil and gas wells and especially to chemical treatment of such wells and the surrounding subterranean formations. More particularly, the invention relates to the type of chemical treatment known in the art as "acidization."

Acidization of wells is a well known process for increasing or restoring the permeability of subterranean formations and thereby facilitating the flow of well fluids such as oil or gas into the well, and also facilitating the injection of fluids into the formation from the well if such is desired.

Acidization, as the term implies, generally consists of treating the formation with an acid. The acid is effective to dissolve certain clogging deposits such as carbonate to open pores and other flow channels thereby increasing, sometimes remarkably, the permeability of the formation.

Many different acidizing procedures have been suggested in the prior art to cope with many different well conditions and special formation or well problems. Hydrochloric acid is the particular acid most frequently employed in acidizing operations at the present time. One condition which has continued to present a special problem is the extreme high temperatures present in many formations, especially in connection with very deep wells. In recent years more and more very deep high-temperature wells have been drilled. Acid is much more reactive at increased temperatures. Generally, acid reactivity doubles with an increase of eighteen fahrenheit degrees. Thus, at 300°F the reactivity of an acid may be about 4000 times what it is at 80°F.

In any acidization process, a problem exists in protecting well equipment such as tubing and casing from corrosion by the acid. For this purpose, corrosion inhibitors are generally added to the acid solution prior to injection of the solution into the borehole. But it is difficult to find inhibitors which are effective at very high temperatures. And the expense of the inhibitor additives, which may be significant even for the types and amounts required at low temperatures, may be prohibitive at very high temperatures.

Another difficulty with inhibitors, especially in the quantities necessary in high-temperature wells, is their tendency to form insoluble solids upon reaction with certain formation materials, thereby causing damage to the formation.

This invention provides an effective acidization method which avoids the above-mentioned problems and yet provides significant increases in permeability. The methods provided are especially useful in high-temperature wells but may also be useful in other contexts of use.

SUMMARY OF THE INVENTION

This invention relieves the above-mentioned problems of the prior art by providing an effective acidization method which may be used without corrosion-inhibiting additives even in deep high-temperature wells.

The methods of the invention include drying of the well conduit and thence injecting nitrogen tetroxide through the well into the surrounding formation. The $N_2O_4$ reacts in the formation with water in situ to form a substantial amount of nitric acid. Nitric acid is effective to increase the permeability, sometimes remarkably, of the formation.

If sufficient connate water is not present in the formation for reaction with the nitrogen tetroxide, water may be injected through the well into the formation prior to the drying step. Alternate water and $N_2O_4$ injection may be desired, drying the well conduit before each injection of $N_2O_4$.

BRIEF DESCRIPTION OF PREFERRED EMBODIMENTS

In accordance with the preferred embodiment of the invention, an acidizing composition comprising nitrogen tetroxide, $N_2O_4$, is provided.

Nitrogen tetroxide exists as an equilibrium mixture with nitrogen dioxide

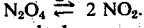
$$N_2O_4 \rightleftharpoons 2 NO_2.$$

At and above ambient temperature, the compound is a reddish-brown gas with a pungent and irritating odor.

$N_2O_4$ reacts with water to yield nitric acid, $HNO_3$, and nitrous acid, $HNO_2$. The unionized portion of nitrous acid formed decomposes into nitric acid and nitric oxide. If water is present in excess, the conversion of $N_2O_4$ to $HNO_3$ is about 67 percent.

Nitric acid is a strong acid which reacts with basic calcareous rock to form carbon dioxide and calcium and magnesium nitrates, thus making nitric acid very desirable for acidization of subterranean formations.

Nitrogen tetroxide is a powerful nitrating agent and reacts with many of the components of crude oil. Nitrated organics are more soluble than their un-nitrated analogs.

Since it is important that corrosive nitric acid not be formed in well conduits such as tubing, it will generally be desired as the first step in the process according to the invention to dry the conduit as by flushing with a sufficient quantity of acetone. For example, two barrels of acetone might be desirable in a typical well.

If there is believed to be insufficient water in the formation to complete sufficient reaction with the composition provided, water may be injected prior to the drying step mentioned above. In most contexts of use, however, the connate water of the formation will likely be sufficient for full conversion of the $N_2O_4$ into nitric acid.

Following drying of the conduit, the $N_2O_4$ composition is injected therethrough generally in the absence of a corrosion-inhibiting additive. The quantity of $N_2O_4$ injected will depend on the volume of the formation to be treated and the extent to which acidization of the formation is desired. Applicant contemplates that the amount of $N_2O_4$ injected will be generally equivalent to the amount of hydrochloric acid used in present methods when 15% HCl has been employed. In laboratory tests, about 0.1–0.4 pore volume $N_2O_4$ based on the formation sample treated have been injected with satisfactory results. The pore volume amounts listed above are based on the region of the formation to be treated wherein the volume of that region is assigned a value of 1.0.

Upon entering the subterranean formation surrounding the well, the nitrogen tetroxide reacts with the water in situ to form a substantial amount of nitric acid. The nitric acid then reacts with the formation to dramatically increase the permeability thereof in most formations.

Alternating injection of $N_2O_4$ and water may be desired in some contexts of use.

The following examples are illustrative to show permeability increase using this embodiment of the invention, in connection with various types and lengths of core material.

EXAMPLE I

A laboratory test was made using an epoxy cannister into which a core material was placed. For this example, the core material was Austin Chalk limestone 0.95 inches long and 1½ inches in diameter.

The core was saturated with about ten pore volumes deionized water and the initial permeability was measured at 3.73 millidarcies.

One milliliter of $N_2O_4$ was then injected into the core, and the permeability of the sample was then measured at 5410 millidarcies, giving a ratio of permeability increase, final permeability/initial permeability, of 1450.

EXAMPLE II

Example I was repeated except the length of the core was 2.2 inches, and 5.3 milliliters of $N_2O_4$ were injected.

The initial permeability was measured at 6.99 millidarcies, and the final permeability was 3240 millidarcies, for a permeability increase ratio of 463.

EXAMPLE III

Example I was repeated except that the sample was limestone from Bedford, Indiana, and the length of the core was 1.2 inches. 3.2 milliliters of $N_2O_4$ were injected.

The initial permeability was measured at 0.446 millidarcies, and the final permeability was 2250 millidarcies, for a ratio of 5000.

EXAMPLE IV

Example I was repeated except that the core material was Luders limestone 1.2 inches long. The initial permeability was 0.277 millidarcies, and the final permeability was 3500 millidarcies, for a ratio of 12,500.

EXAMPLE V

A sample of Pecos sandstone one inch long was utilized and the core was saturated with a solution of deionized water having 50,000 ppm sodium chloride and 5,000 ppm calcium chloride dihydrate therein. The initial permeability was measured at 0.097 millidarcies.

1.3 milliliters of $N_2O_4$ were injected, and the final permeability was measured at 1.99 millidarcies, for a permeability increase ratio of 20.5.

(The brine solution was intended to prevent swelling of clays).

EXAMPLE VI

A sample of Austin Chalk limestone similar to Example I was prepared, 1.1 inches in diameter.

The core was saturated with water in the same manner as Example I, and the initial permeability was measured at 1.04 millidarcies.

The core was then saturated with a light crude oil to simulate a residual oil saturation of 30 percent. The oil was displaced with water and the residual oil permeability measured at 0.22 millidarcies.

Then 1.0 milliliters of $N_2O_4$ were injected and the final permeability was measured at 5110 millidarcies.

Thus, the permeability increase ratio, final permeability/residual oil permeability, was 23,200.

EXAMPLE VII

Example VI was repeated except that the core was Bedford, Ind. limestone.

The initial permeability was 0.33 millidarcies, the residual oil permeability 0.072, and the final permeability 4110, for a permeability increase ratio of 57,100.

EXAMPLE VIII

Example VI was repeated except that the core material was Berea sandstone 0.90 inches in length. The brine material of Example V was used to initially saturate the core and to displace the light crude. The initial permeability was 212 millidarcies and the residual oil permeability was 34 millidarcies.

1.5 milliliters of $N_2O_4$ were injected and the final permeability was 128, for a permeability increase ratio of 3.76.

All of the above examples were conducted at ambient temperature and pressure.

Other experiments were conducted using Berea sandstone cores revealing no increase in permeability, leading to the conclusion that utility of the invention may be limited in certain formation types such as relatively impermeable sandstones, especially in comparison to the much better results obtained in the tested limestone formations.

Further experiments were made similar to Examples VI and VIII for comparison purposes using HCl rather than $N_2O_4$ as the acidization composition. The results using $N_2O_4$ compared very favorably with those obtained using HCl.

It is seen from the above examples that dramatic increases in permeability may be realized utilizing the processes of the invention.

Although these examples were conducted at ambient temperature, it is contemplated that the invention will find its primary utility in contexts of use such as deep wells wherein the temperature is quite high, since one of the key features of the invention is the fact that no corrosion-inhibiting additive is required in the process.

Although it may be desirable to inject the $N_2O_4$ compositions in the processes of the invention at pressures somewhat greater than those prevailing in the subterranean formation surrounding the borehole, it is not presently contemplated that pressures on the order of those required for fracturing would be utilized in connection with the invention.

Another advantage of the invention is that the reaction of the $N_2O_4$ is with connate water in situ in the formation, the advantageous effect thus often reaching into areas remote from the borehole.

Yet another advantage of the invention is the strong reactivity, and thus great increases in permeability, provided by nitric acid. Because of this strong reactivity, corrosion problems have impeded past use of nitric acid in such contexts of use.

Although the invention has been described in terms of embodiments which applicant believes to represent the best mode of the invention at the time of this application, it will be apparent to those of skill in the art that various changes might be made in the processes disclosed without departing from the scope of the invention as defined by the following claims.

What is claimed is:

1. A process for chemical treatment of wells comprising:
   providing an acidizing composition of nitrogen tetroxide;
   injecting said composition through the well bore into the subterranean formation surrounding the well;
   said composition reacting with the water in situ in said formation to form at least a substantial amount of nitric acid, said acid being effective to react with formation materials to increase the permeability of said formation.

2. A process for chemical treatment of a well having a conduit therein comprising:
   providing an acidizing composition of nitrogen tetroxide;
   drying said well conduit by flushing a drying agent therethrough;
   injecting said composition through the well conduit into the subterranean formation surrounding the well;
   said composition reacting with the water in situ in said formation to form at least a substantial amount of nitric acid, said acid being effective to react with formation materials to increase the permeability of said formation.

3. A process for chemical treatment of a well having a conduit therein comprising:
   providing an acidizing composition of nitrogen tetroxide;
   injecting water through said well into the subterranean formation surrounding said well;
   drying said well conduit by flushing a drying agent therethrough;
   injecting said composition through the well conduit into the subterranean formation surrounding the well;
   said composition reacting with the injected water in situ in said formation to form at least a substantial amount of nitric acid, said acid being effective to react with formation materials to increase the permeability of said formation.

4. The process in accordance with claim 3, wherein water and $N_2O_4$ are alternately injected into said formation through said well.

5. The process in accordance with claim 4, wherein the well conduit is dried prior to each injection of $N_2O_4$.

6. The process in accordance with claim 3, wherein said $N_2O_4$ is injected in the absence of a corrosion-inhibiting additive.

* * * * *

UNITED STATES PATENT AND TRADEMARK OFFICE
Certificate

Patent No. 3,929,192                           Patented December 30, 1975

Robert H. Friedman

Application having been made by Robert H. Friedman, the inventor named in the patent above identified, and Getty Oil Company, Los Angeles, California, a corporation of Delaware, the assignee, for the issuance of a certificate under the provisions of Title 35, Section 256, of the United States Code, adding the name of Julianne D. Krause as a joint inventor, and a showing and proof of facts satisfying the requirements of the said section having been submitted, it is this 17th day of May 1977, certified that the name of the said Julianne D. Krause is hereby added to the said patent as a joint inventor with the said Robert H. Friedman.

FRED W. SHERLING,
*Associate Solicitor.*